United States Patent [19]
Roper

[11] 4,238,949
[45] Dec. 16, 1980

[54] PROCESS AND APPARATUS FOR MAKING METAL OUTERS AND INNERS

[75] Inventor: Ralph E. Roper, Indianapolis, Ind.

[73] Assignee: The General Tire & Rubber Company, Akron, Ohio

[21] Appl. No.: 937,278

[22] Filed: Aug. 28, 1978

Related U.S. Application Data

[63] Continuation-in-part of Ser. No. 691,720, Jun. 1, 1976, abandoned, Continuation-in-part of Ser. No. 622,269, Oct. 14, 1975, abandoned.

[51] Int. Cl.³ .............................................. B21D 22/00
[52] U.S. Cl. ........................................ 72/358; 72/352
[58] Field of Search ................. 72/347, 358, 344, 352; 113/120 Q

[56] References Cited

U.S. PATENT DOCUMENTS

| | | | |
|---|---|---|---|
| 509,959 | 12/1893 | Small | 113/120 Q |
| 718,379 | 1/1903 | Pawle | 72/358 X |
| 1,940,302 | 12/1933 | Humphrey et al. | 267/54 |
| 1,959,256 | 5/1934 | Zerk | 267/54 |
| 2,150,708 | 3/1939 | Andrews et al. | 72/358 X |
| 2,506,657 | 5/1950 | Webster | 29/156 |
| 2,583,270 | 1/1952 | Lynall | 72/358 X |
| 2,725,692 | 12/1955 | Andreae | 51/170 |
| 2,819,105 | 1/1958 | Behnke | 287/85 |
| 2,930,483 | 3/1960 | Kaul | 207/10 |
| 3,144,955 | 8/1964 | Armstrong | 113/120 Q X |
| 3,199,186 | 8/1965 | Simpson | 29/450 |
| 3,224,243 | 12/1965 | Van Deberg | 72/354 |
| 3,263,477 | 8/1966 | Roper | 72/401 |
| 3,314,278 | 4/1967 | Bergman | 72/377 |
| 3,348,511 | 10/1967 | Cowles | 72/358 X |
| 3,368,852 | 2/1968 | Herbenar et al. | 308/26 |
| 3,438,111 | 4/1964 | Wilcox | 72/347 X |
| 3,495,859 | 2/1970 | Hassan | 287/100 |
| 3,504,513 | 4/1970 | Black | 72/112 |
| 3,543,559 | 12/1970 | Hawkins et al. | 72/348 X |
| 3,668,918 | 6/1972 | Benteler | 72/364 |
| 3,740,993 | 6/1973 | Moore, Sr. | 72/370 |
| 3,789,650 | 2/1974 | Alexoff | 72/360 |
| 3,893,775 | 7/1975 | Sievers et al. | 403/225 |

FOREIGN PATENT DOCUMENTS 390392 2/1924 Fed. Rep. of Germany .
770625 3/1957 United Kingdom .

*Primary Examiner*—Leon Gilden

[57] ABSTRACT

Process and apparatus for making a metal annular member of precise tolerances and desired surface finish. An external die has a continuous die surface of the configuration desired for the external surface of the metal annular member and an annular ridge surrounding the inside of the die for seating one end of an annular sheet metal blank. A first punch engages the sheet metal blank and drives it into the external die so as to reduce the external diameter of the blank and seat it against the ridge. The precise tolerance of the die surface of the external die determines both the external and at least a portion of the internal dimensions produced in the annular sheet metal blank. The first punch is axially movable to an endmost position wherein substantially all of the blank has been forced into the die. An ejector punch is positioned inside of the external die and operates to provide a portion of the forming die surfaces as well as to eject the completed workpiece.

12 Claims, 37 Drawing Figures

PROCESS AND APPARATUS FOR MAKING METAL OUTERS AND INNERS

CROSS REFERENCE TO RELATED APPLICATIONS

This is a continuation-in-part application of my U.S. patent application Ser. No. 691,720 filed June 1, 1976, now abandoned which is a continuation-in-part application of my U.S. patent application Ser. No. 622,269 filed Oct. 14, 1975, now abandoned.

BACKGROUND OF THE INVENTION

This invention relates to a method and apparatus for making a metal annular member of precise tolerances and also to a method for providing desired surface finish.

Suspension systems, particularly those suspension systems found in automotive applications, make substantial use of devices commonly known as bushings. Generally these bushings consist of at least two more or less concentric annular members, usually of metal, separated by a rubber element of specific design which element is under compression. Such devices are sometimes called outer and inner metals or "outers" and "inners" and are more fully described in, for example, U.S. Pat. Nos. 3,893,775; 3,495,859; and 3,199,186. The present procedure for making these annular members involves several draw die steps wherein an initially flat blank is drawn in successive draw die procedures into the desired configuration. This procedure is not entirely satisfactory because it is expensive, requiring repeated transfer steps, and it produces a product not always as accurate as desired. The relevant prior art may also include the U.S. Pat. No. 2,506,657 to Webster; U.S. Pat. No. 3,224,243 to VanDerberg; U.S. Pat. No. 3,789,650 to Axeloff; U.S. Pat. No. 3,263,477 to Roper; U.S. Pat. No. 2,930,483 to Kaul; U.S. Pat. No. 3,314,278 to Bergman; U.S. Pat. No. 3,668,918 to Benteler; and U.S. Pat. No. 3,740,993 to Moore.

In certain bushings it is desirable or necessary that the surface of the outer or inner which contacts the rubber element be so configured or finished as to grip the rubber element so as to eliminate or reduce slippage therebetween. One prior art procedure for preventing relative movement between the metal sleeves and the elastomeric insert is disclosed in Sievers U.S. Pat. No. 3,893,775 and involves sandblasting the surfaces of the metal sleeves and thereafter forming a phosphate coating thereon. It is desirable that improved means be provided for forming a rough gripping surface on the metal sleeves of the bushing. It is desirable that better control over the precise form of the surface texture be provided and that this be accomplished inexpensively. Other prior art related to this feature are U.S. Pat. No. 1,940,302 to Humphre; U.S. Pat. No. 1,959,256 to Zerk; U.S. Pat. No. 2,725,692 to Andreae; U.S. Pat. No. 2,819,105 to Belinke; U.S. Pat. No. 3,368,852 to Herbenar; and U.S. Pat. No. 3,504,513 to Black.

SUMMARY OF THE INVENTION

One embodiment of the process of the invention might include the making of a metal annular member of precise tolerances by placing an annular sheet metal blank between a punch and an external die. The annular blank is forced into the external die by means of the punch so that the external die reduces the outside diameter of the blank and seats one end of the blank against the ridge surrounding the inside of the external die. The punch is then driven into the annular member and the external die until the punch seats against the other end of the blank and forms the blank into the desired annular member configuration as determined by the configuration of the punch and the external die and the ridge thereon.

One embodiment of the surface roughening procedure of the present invention involves moving the sheet metal of the annular sheet metal blank between a pair of rollers prior to forming the sheet metal into an annular configuration, said rollers having a textured surface configuration.

One embodiment of the forming apparatus of the present invention might include an external die having a continuous die surface of the configuration desired for the external surface of the metal annular member. The die has an annular ridge surrounding the inside of the die for seating one end of an annular sheet metal blank thereon. A first punch is mounted with relation to the external die for reciprocal travel through a path into and out of the external die. The first punch is shaped and proportioned to engage and carry the metal blank into the external die inside of the external surface for seating it against the ridge. The first punch is movable axially through the path to an endmost position wherein substantially all of the blank has been forced into the external die.

Objects of the invention include the providing of an improved process and apparatus for making metal annular members of precise tolerances and the providing of a process and apparatus for making metal annular members of precise tolerances without the expenditure of an excessive amount of energy.

DESCRIPTION OF THE PREFERRED EMBODIMENT

Figure 1:
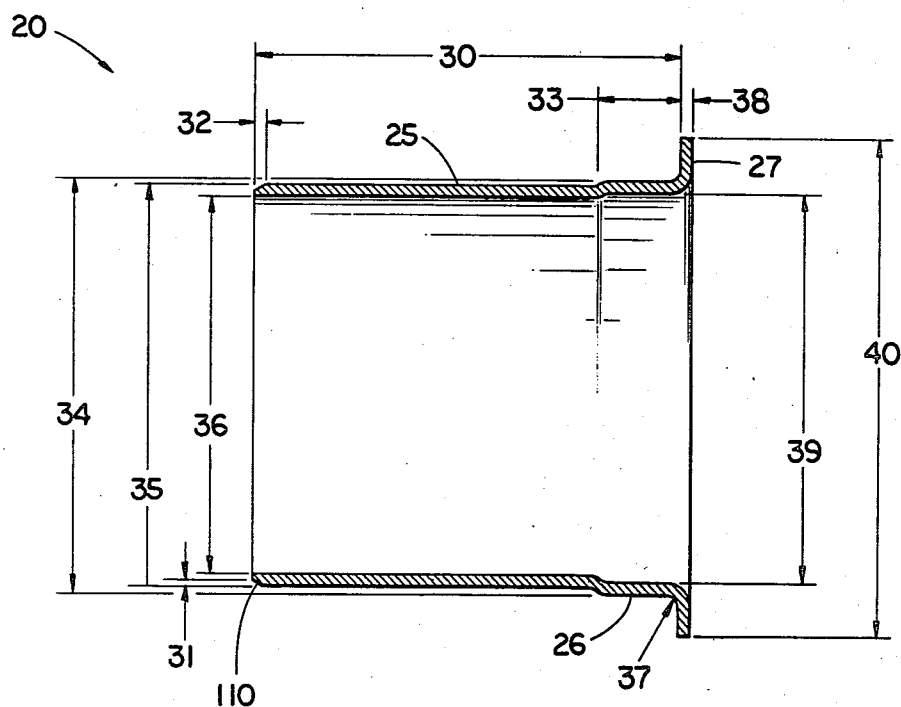
FIG. 1 is an axial section of an annular member produced by the method and apparatus of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
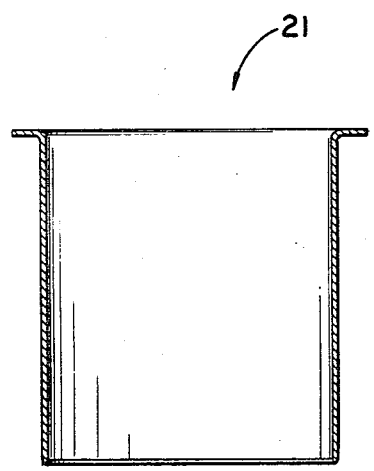
FIGS. 3 and 4 are views similar to FIG. 1 of other types of annular members produced by the present invention.
Figure 4:
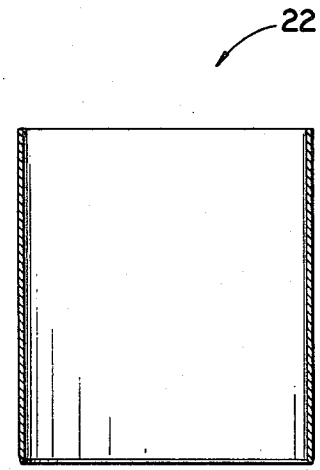
Figure 5:
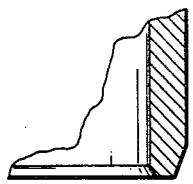
FIG. 5 is an enlarged section of a portion of the structure illustrated in FIGS. 3 and 4.

Referring more particularly to FIG. 1, there is illustrated a common type of annular member 20. Other annular members 21 and 22 are shown in FIGS. 3 and 4. The annular member 20 includes a reduced diameter portion 25, an enlarged diameter portion 26 and a radially outwardly extending flange 27. Such annular members are used as a part of shock absorbers and must be formed to relatively precise tolerances. As an example, the annular member illustrated in FIG. 1 has a length dimension tolerance 30 in one specific embodiment which ranges between 2.010 and 1.990 inches. The following tolerances are also required of that specific embodiment of annular member: 31 0.02 min.", 32 0.03–0.08", 33 0.430—0.470", 34 1.920-1.915", 35 1.853-1.858", 36 1.732-1.742", 37 0.05" max, 38 0.055–0.073", 39 1.792-1.802", and 40 2.310-2.290". The above dimensions are of course specific only to a particular embodiment of an annular member but serve to indicate that such annular members are required to be manufactured according to precise tolerances. Similar such precise tolerances are required for the annular members of FIGS. 3 and 4. FIG. 5 shows in detail the cross sectional end edge configuration of the outer metals of FIGS. 1, 3 and 4.

Figure 2:
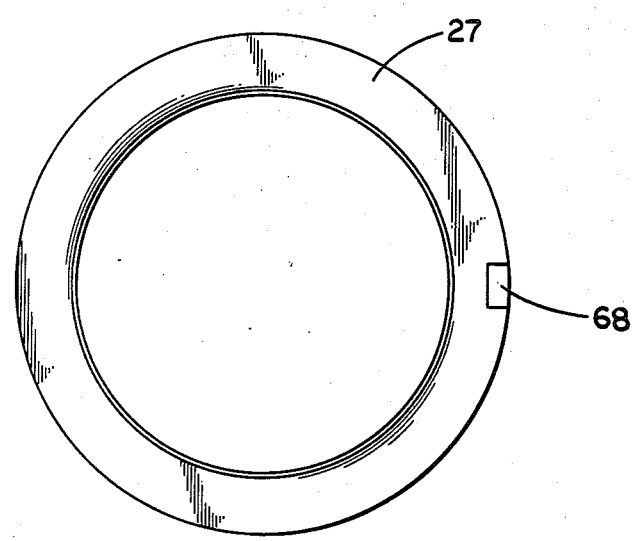
FIG. 2 is an end elevation of the structure illustrated in FIG. 1.

In order to manufacture the annular member in accordance with the present invention, a cylindrical blank 45 (FIG. 6) is provided which has an outside diameter 46 and a predetermined length 47 both somewhat greater than the outside diameter and length, respectively, desired for the final annular member. The blank 45 also has a precision wall thickness 50. The blank is formed of welded tubing, that is, flat sheet material which is welded into a cylinder with the outer weld surface skived and the inner weld surface hot planished to nominal wall thickness. The welded tubing in the above described specific embodiment is SAE 1010 commercial quality cold rolled steel. It is desirable that the wall thickness 50 of the blank be precise, for example, to produce the specific embodiment described above, that it be within a range of 0.057"–0.062" for the reason that the wall thickness, together with the deformation procedure effected upon the outer surface of the blank is what determines at least a portion of the ID of the blank in its final form. Again referring to the above specific example and the dimensions and tolerances given with regard to the product shown in FIGS. 1 and 2, the following chart can be used to determine the required dimensions of the tube blank to produce the dimensions:

| Part Print Data | Tube Blank Data |
| --- | --- |
| Mean Body O.D. = —— | O.D. = ——(Mean + .010) |
| Mean Body I.D. = —— | Wall = ——(Mean minus .002) |
| Mean Flange O.D. = —— | I.D. = ——(Blank O.D. minus 2 × Blank Wall) |
| Flange Extension = —— | |
| Mean Length = —— | Length = ——(Mean P/P Length + Flange Extension) |
| Wall Thickness = —— | |

Mean Body O.D. is defined as the dimension 35 in FIG. 1, Mean Body I.D. as the dimension 36, Mean Flange O.D. as the dimension 40, Flange Extension is defined as one half of the dimension 40 minus the dimension 36, Mean Length is the dimension 30 plus the dimension 38, and Wall thickness is defined as one half of the difference between the dimension 35 and the dimension 36. Filling out the table with the formula and dimensions given above produces the following requirements for the tube blanks:

| Part Print Data | Tube Blank Data |
| --- | --- |
| Mean Body O.D. = 1.8555 | O.D. 1.8655 |
| Mean Body I.D. = 1.737 | Wall 0.05725 |
| Mean Flange O.D. = 2.300 | I.D. 1.751 |
| Flange Extension = 0.2815 | Length 2.3455 |
| Mean Length 2.064 | |
| Wall Thickness 0.05925 | |

Of course the above specific example is only an example and annular members of different dimensions can be manufactured. The formulas given in the chart above on the right may be used to calculate blank sizes for annular members ranging in size from approximately 2.5″ O.D. down to about 1.3″ O.D. While ten thousandths of an inch (0.01″) is the amount of reduction in O.D. recommended in the chart above, the actual amount of such reduction should be determined in the final analysis by trial and error, so as to produce parts that meet surface quality and dimensional specifications as consistently as possible.

Such trial and error is required because of commercially available variances in the diameter of the tube blank stock. While these variances are not as much as 0.010″, and consequently a 0.010″ reduction is enough to reduce the diameter of any blank no matter at what end of the tolerance scale it is, too little reduction in the blank diameter may not be enough to deform the blank metal plastically. The exact amount of diameter reduction required to deform the metal permanently will depend on the metallurgical properties of the metal used, as well as the wall thickness and diameter of the desired part. Generally, parts of thicker wall thickness require less diameter reduction, while parts having greater diameters require more reduction in these diameters to impart permanent plastic deformations to them.

At the same time, care must be taken to insure that the diameter of the tube blank is not reduced too much, or else other quality problems will arise in the final parts produced. For example, if the diameter of the blank were reduced thirty thousandths of an inch (0.030″) when ten thousandths of an inch (0.010″) would have been sufficient, the surface quality would probably suffer, the part would probably have dimensional imperfections as well as variations from part to part, and conceivably buckling might occur.

Figure 7A:
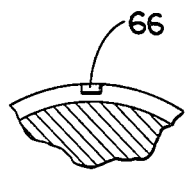
FIG. 7A is a fragmentary section taken along the line 7A—7A of FIG. 7.
Figure 7B:
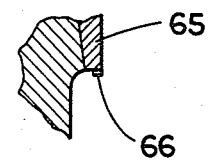
FIG. 7B is an enlarged fragmentary section similar to FIG. 7 but with the workpiece removed showing the structure of FIG. 7A.
Figure 7:
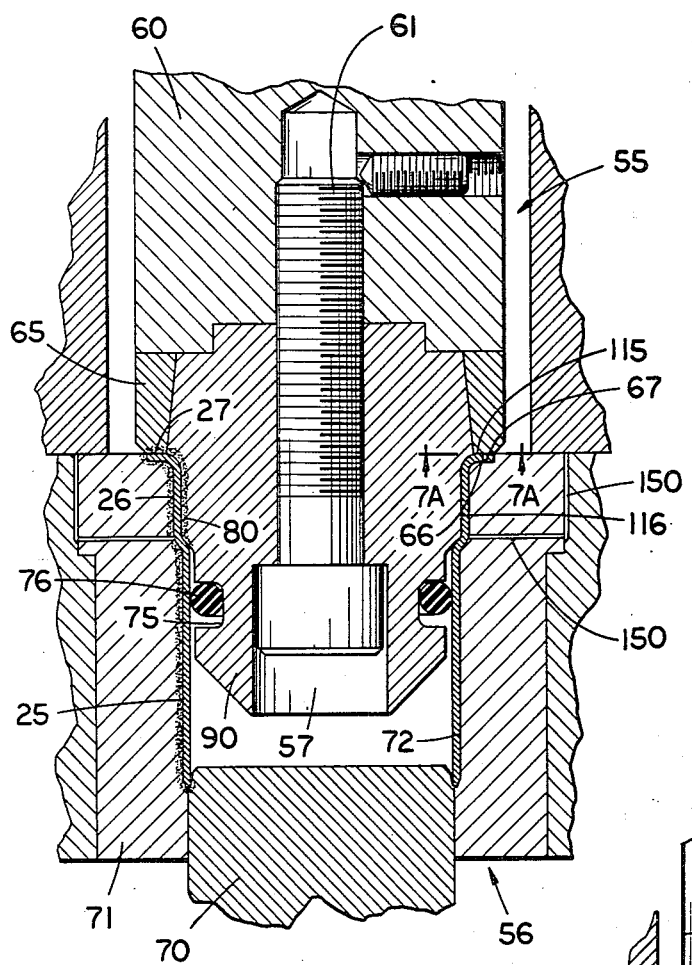
FIG. 7 is an axial section through the forming apparatus of the present invention showing the final step in the process of making an annular member.

Referring now to FIG. 7, the structure of the forming apparatus is illustrated in detail as including a punch 55 and an external die 56. Punch 55 includes two members 57 and 60 with the member 57 secured to the member 60 by means of the threaded member 61. It should be noted that a stencil member 65 has a lower stencil 66 which cooperates with the trap ledge 67 forming a part of the external die 56 to produce an indentation 68 (FIG. 2) which functions as an identifying indicia on the flange 27 of the outer metal. In one specific embodiment of the invention the stencil 66 projects 0.020″ where the thickness of the flange is 0.060″ whereby the resulting indentation is approximately ⅓ of the flange thickness.

The punch 55 is reciprocated by a suitable die press such as, for example, a 30 stroke-per-minute 100 ton capacity straight side mechanical press with a 10″ stroke. The 100 ton capacity is mentioned to make the press capable of handling six dies or (six parts) at a time when a lesser capacity press, i.e. 16.7 ton, would operate to make one part at a time. The external die 56 thus is held in position so that there can be reciprocation movement of the punch 55 relative to the external die 56. Also mounted for reciprocation within the external die 56 is an ejector and an end coining punch 70. The ejector punch 70 is formed of hardened tool steel. The punch member 57 as well as the die insert 71 which has thereon the inner continuous die face 72 is formed of hardened ground and polished treated high speed steel.

It should be noted that the punch member 57 has an externally opening recess 75 which receives an O-ring 76. The function of the O-ring 76 is to prevent the blank from falling off of the punch when the press is stopped in mid-cycle. In FIG. 7 the shaded area 80 extending around the flange 27, the enlarged diameter portion 26 and the outside of and bottom of the reduced diameter portion 25 indicates contact of the workpiece or blank with the punch and the die 55 and 56. Thus, there is no contact of the punch with the inside surface of the reduced diameter portion 25, and this ID is determined by the deformation of the OD at the reduced diameter portion. It is also intended that there be no extruding action in the manufacture of the annular member of the present invention.

It has been found desirable in the preferred embodiment of the invention to form the outer die 71 working surfaces of carbide to provide a good finish of the part. The reasons for the use of carbide is to provide long wear and eliminate galling. With regard to the punch 55 high speed steel is used, for example, heat treated to Rockwell 62 to 64 C scale.

Figure 8:
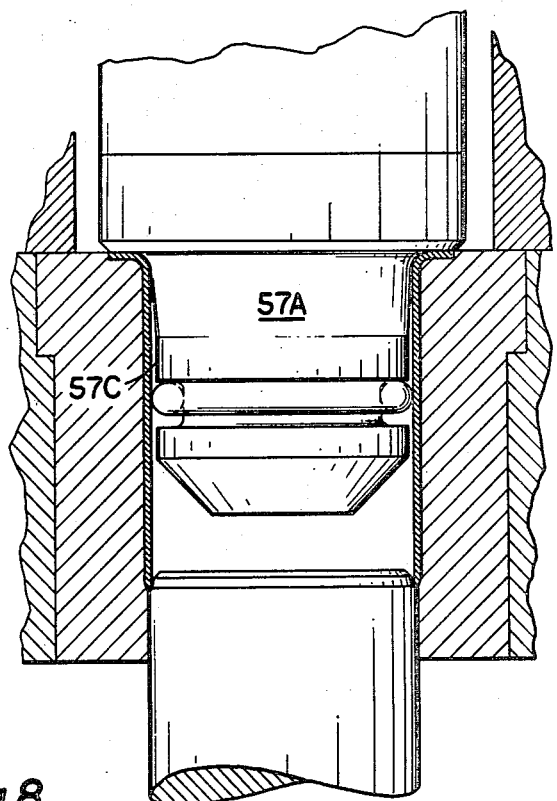
FIGS. 8 and 9 are views similar to FIG. 7 showing the final step in the forming process of making the alternative forms of annular members shown in FIGS. 3 and 4 respectively.
Figures 9, 12:
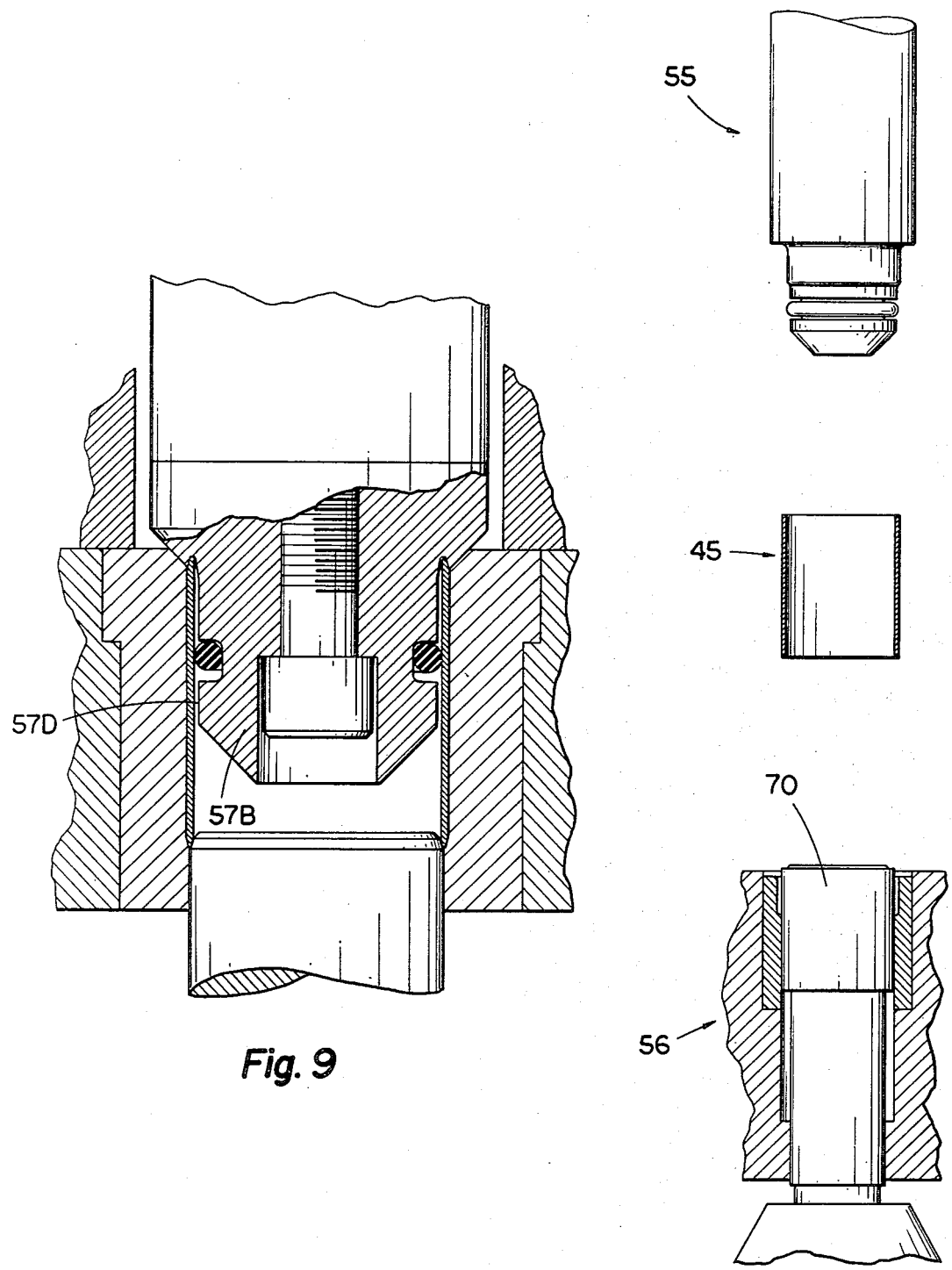
FIGS. 12–18 are somewhat schematic views of the structure illustrated in FIG. 7 showing serial steps in the process of making an annular member.

FIGS. 8 and 9 are generally similar to FIG. 7 but show the punch members 57A and 57B and the corresponding external dies as having a slightly different configuration. It will be noted, however, that in FIGS. 8 and 9 the outwardly facing surfaces 57C and 57D of the punch member 57A and 57B do not contact a greater portion of the internal surface of the annular member as compared to FIG. 7. Thus, this relatively large portion of inner surface is determined by the shrinkage of the outer surface during the forming procedure, together with the precise wall thickness of the blank 45.

Figure 6:
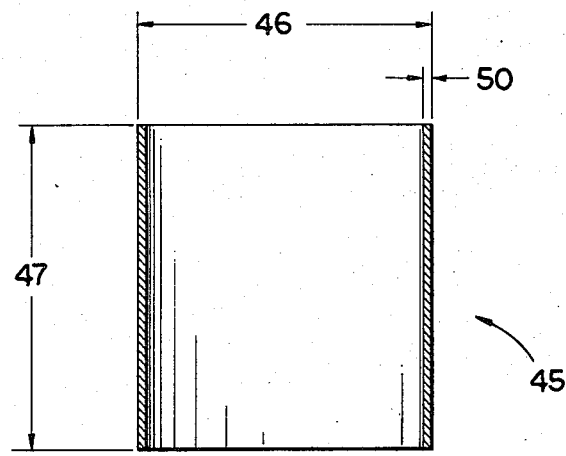
FIG. 6 is a view similar to FIGS. 1, 3 and 4 of a metal blank used in the process of the present invention.
Figure 10:
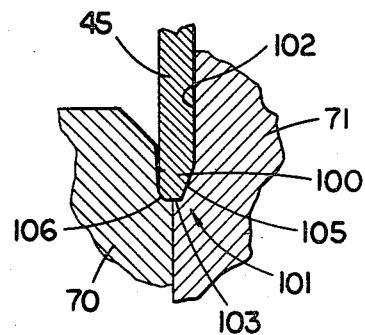
FIG. 10 is an enlarged detalied sectional view of a portion of the structure illustrated in FIGS. 7, 8 and 9.
Figure 11:
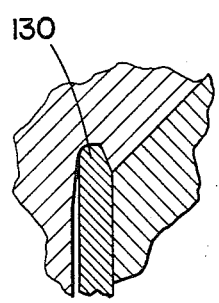
FIG. 11 is an enlarged sectional detailed view of a portion of the structure illustrated in FIG. 9.
Figures 13, 14, 15:
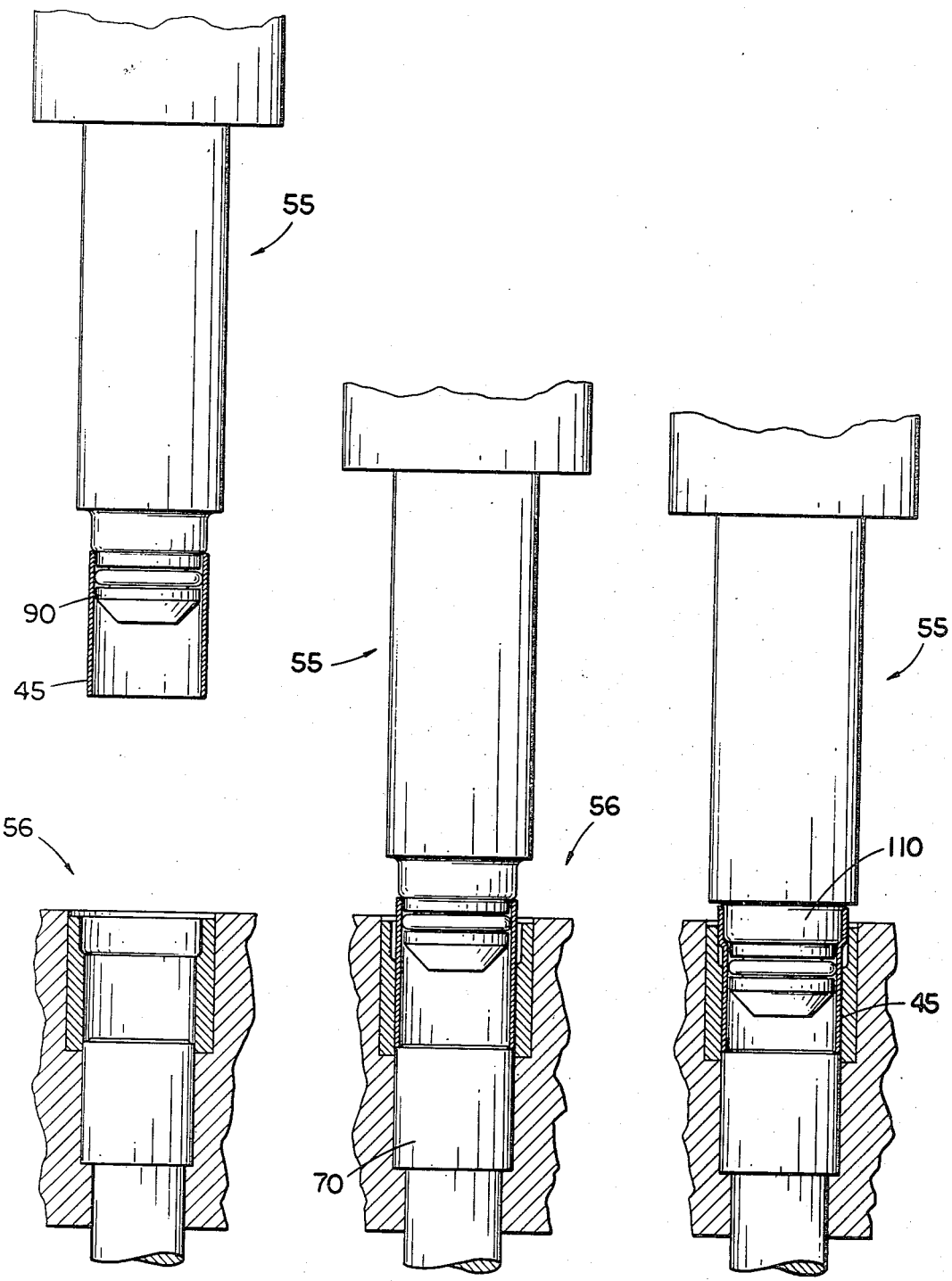

Referring now to the somewhat schematic FIGS. 12-18, the operation of the structure of FIG. 7 is shown serially. Thus, in the process of the present invention the blank 45 of FIG. 6 is positioned between the punch 55 and the external die 56. As shown in FIG. 13, the punch 55 moves downwardly into the blank 45 until the blank is received upon the reduced diameter portion 90 of the punch member 57. The O-ring 76 serves to maintain the blank 45 on the reduced diameter portion 90 of the punch in the event the punch stops in mid stroke. In FIG. 14 the next step is shown of the punch moving downwardly carrying the blank 45 into the die 56 until the lower end 100 of the blank 45 (see FIG. 10) seats against a ridge 101 formed on the external die member 71. Note that the ridge 101 includes a radially extending horizontal surface 103 and a tapered surface 105. The tapered surface 105 is contiguous with the inwardly facing cylindrical surface 102 of the external die.

It will also be evident from FIG. 14 that the ejector die 70 is at its lower end of travel relative to the external die 56. Note also that the ejector die has a ledge 106 (FIG. 10) which is engaged by the lower end 100 of the blank 45. The surfaces 105, 103, 101 and 106 serve to coin the lower end of the workpiece and to produce the lower end configuration illustrated in FIG. 10. The next step of the process is the continued downward movement of the punch 55 into the position illustrated in FIG. 15 wherein the enlarged diameter portion 110 of the punch has been driven into the workpiece 45 so as to begin to form the enlarged diameter portion 26 of the outer metal.

Figures 16, 17, 18:
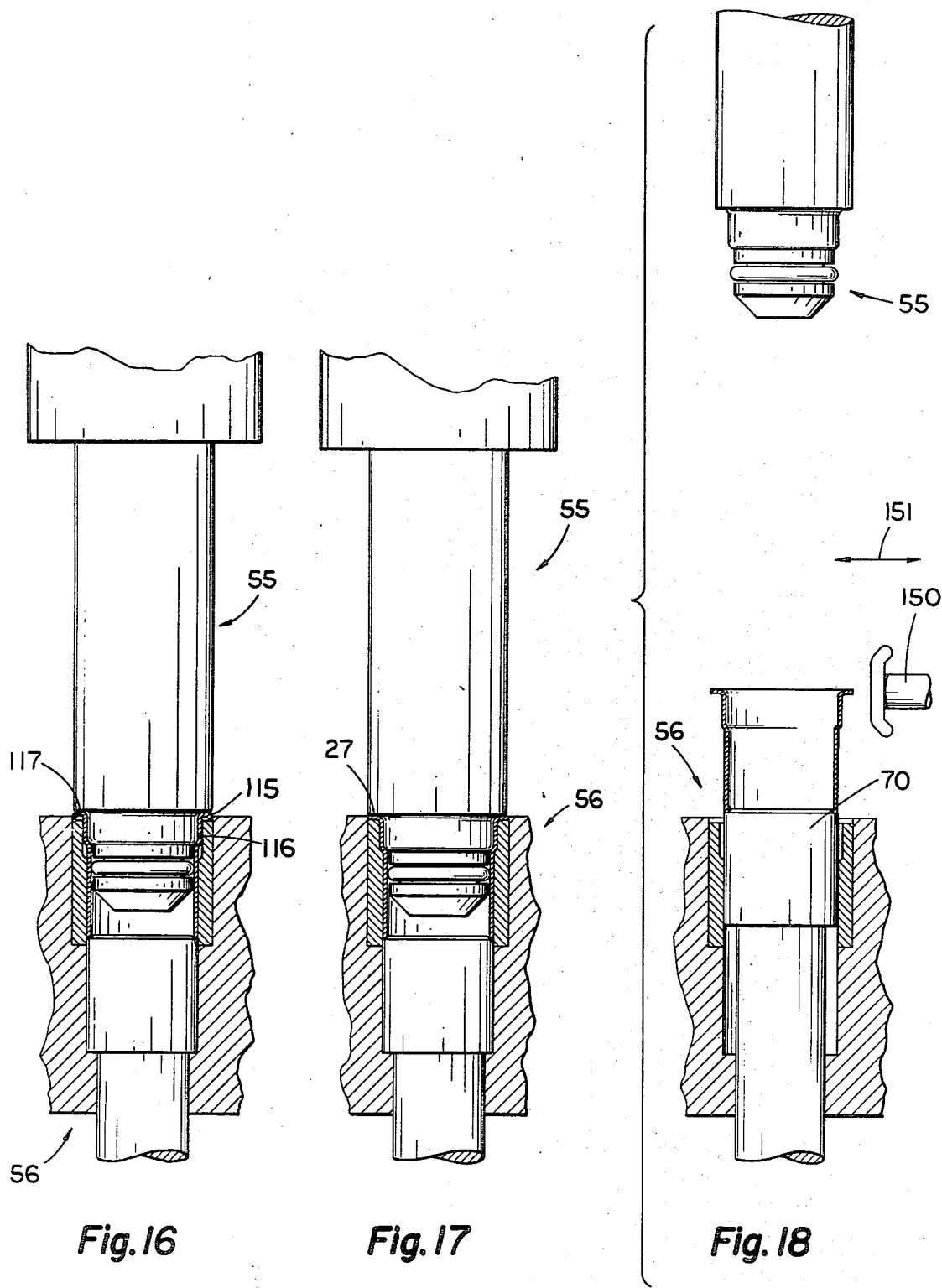

The punch 55 includes an outwardly extending surface 115 curving smoothly into a downwardly extending surface 116. As the punch 55 continues its downward movement, it curls the upper end portion 117 of the blank 45 into the position illustrated in FIG. 16 and the enlarged diameter portion 26 of the annular member is further formed. FIG. 17 shows the punch at its bottom position fully seated against the outer die 56. It will be noted that the flange 27 has been fully formed by being trapped within the trap ledge 67, this trap ledge determining the outer diameter of the flange 27. The thus formed annular member is then ejected by raising of the punches 55 and 70 to the positions illustrated in FIG. 18.

Figure 19:
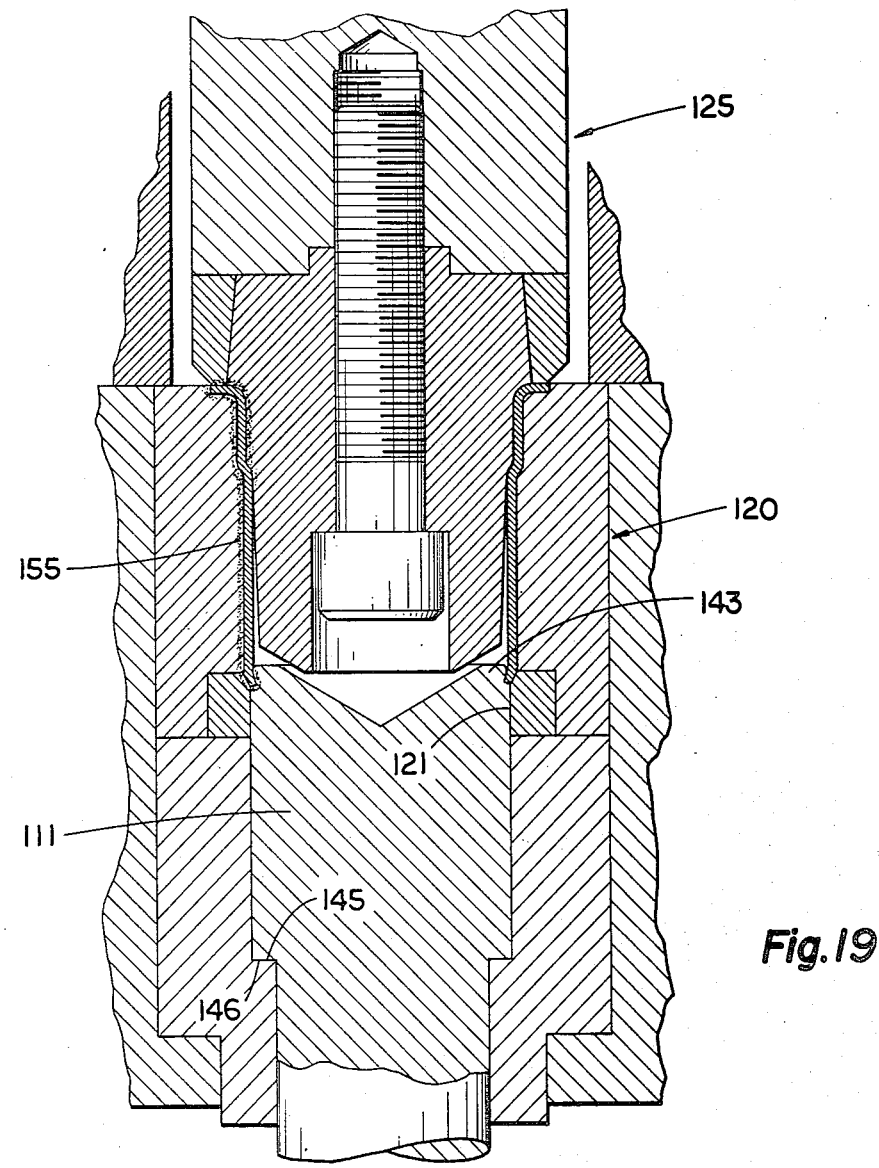
FIGS. 19, 20, 21 and 22 are views similar to FIGS. 7, 8, 9 and 10, respectively, but showing alternative forms of the invention.
Figure 22:
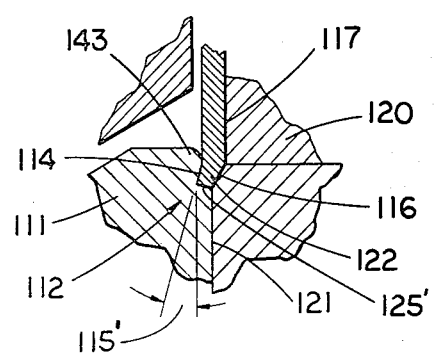

Referring now to FIGS. 19 and 22, an alternative preferred form of the invention is shown and is identical to the above described configuration and process of FIGS. 5, 6, 7, 11 and 12-18 with one important difference being the forming of the lower end of the workpiece. The most difficult tolerances to meet in connection with the forming of the annular member of FIG. 1 relate to the chamfer 110'. The reason for this is that the plastic deformation of the metal in the area of the chamfer is more radical than in other portions of the workpiece. In certain applications of the annular members, i.e. automotive suspension bushings, the user is willing to give up a constant internal diameter in favor of an in-turned lower end of the outer as shown in FIGS. 19-22. This modified form in certain situations has been found preferable because it assists in gripping a rubber or rubber-like sleeve of a shock absorbing unit.

In FIG. 19 the ejector punch or knockout pin 111 is formed with a radially inwardly extending groove 112 including a surface 114 which extends inwardly relative to the vertical at an angle of 15 degrees. That is, the angle 115' is 15 degrees. Also, the horizontal surface 103 of the ridge is eliminated and replaced with the tapering surface 116 which leads from the cylindrical inwardly facing surface 117 of the external die 120 to the cylindrical inwardly facing surface 121 of the external die 120. In the process for making the annular member of FIGS. 19 and 22, the lower end 122 of the blank is moved by the punch 125 into the external die reducing the outside diameter of the blank as described above; however, when the lower end of the blank is moved against the ridge or tapered surface 116, it is guided inwardly into the inwardly extending groove 112 thereby forming a tapered chamfer on the lower end of the blank. The groove 112 has an outwardly and downwardly extending surface 125' which cooperates with the surfaces 114 and 116 to redirect the metal of lower end of the workpiece and to thereby form it without radical metal deformation.

Figure 21:
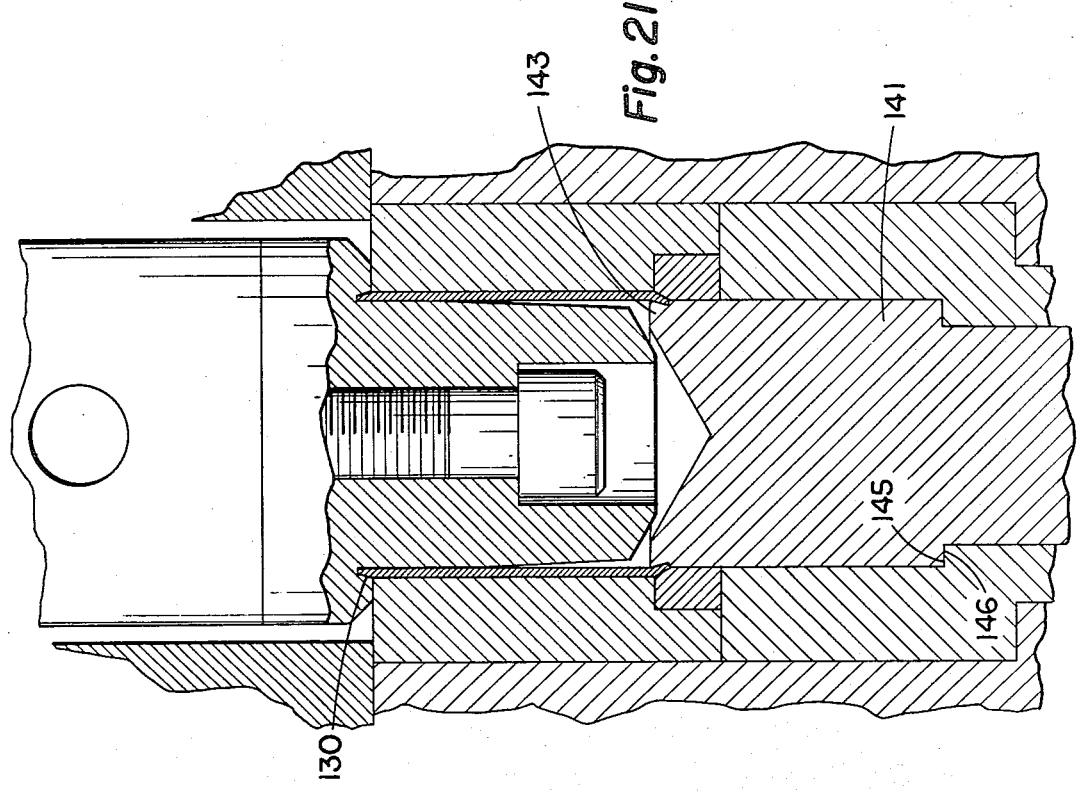
Figure 20:
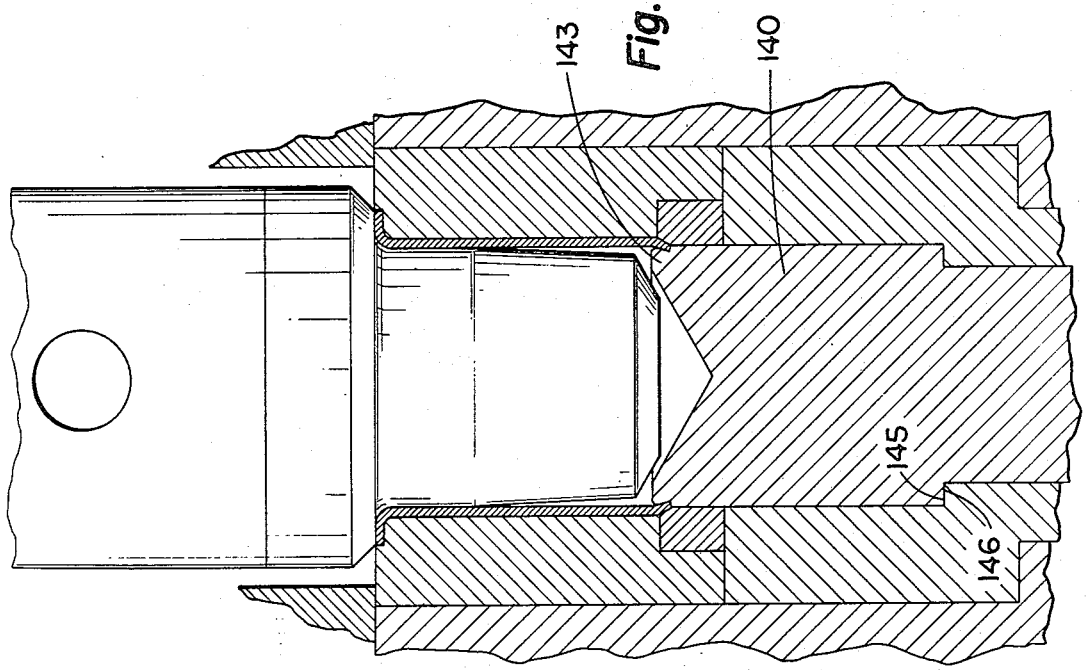

FIGS. 19, 20 and 21 correspond to FIGS. 7, 8 and 9, respectively, except that they all incorporate the changed process and apparatus for redirecting the lower end of the workpiece. While the specific construction features of FIGS. 19, 20 and 21 are different in some respects, the purpose and function is generally the same. Thus, in FIGS. 9 and 11 the somewhat pointed or chamfered upper end 130 of the workpiece is produced entirely by the punch 57B, and this is also true of FIG. 21. Also, the manner of limiting downward movement of the ejector punch 111, 140 and 141 is shown in FIGS. 19, 20 and 21 as involving abutting surfaces 145 and 146 and is not shown in FIGS. 7, 8 and 9. Also, the O-rings of FIGS. 7, 8 and 9 are not shown, although they may also be used in the embodiments of FIGS. 19, 20 and 21 for the same purpose. Another feature which is present in the embodiments of FIGS. 19, 20, and 21 but is not shown is lube vents 150 in the external die. These vents permit the flow out of the external die of oil used to lubricate the inside of the external die. During the forming process such oil needs to escape to allow the external die to properly form the workpiece. The vents 150 are connected through a duct (not shown) in the external die to atmosphere.

FIGS. 19, 20, 21 and 22 show a form of the invention wherein the lower end 122 of the blank requires a larger of more pronounced chamfer than can be generated by the apparatus illustrated in FIGS. 7, 8, 9 and 10. In the embodiments of FIGS. 7, 8, 9 and 10 the maximum chamfer that can be generated or coined by the downward force of the tubular blank is approximately one-third of the metal thickness. If the apparatus of FIGS. 7-10 is used in an effort to produce a greater chamfer, the excessive force which is used causes the blank to collapse inwardly in the area above the chamfer.

Therefore, the alternate method of FIGS. 19, 20, 21 and 22 is provided to allow the chamfered end of the part to form inwardly creating a greater lead or chamfer effect but requiring a substantially reduced forming force. FIGS. 19, 20, 21 and 22 also clearly show the chamfered end of the part formed around the enlarged head 143 or end of the ejector punch 111, 140 or 141. The part is removed from the knockout pin by a force exerted at the end of the forming cycle after the part has been ejected to the position of FIG. 18, in other words, has been moved above the external die 120. At this time a mechanical ejector mechanism 150 shown schematically in FIG. 18 moves in the direction of arrows 151 and knocks the part off of the ejector punch 111. The slight stretching action required to remove the part from the ejector punch 111 does not exceed the elastic limit of the metal of the part and for this reason does not permanently deform the part.

Figure 23:
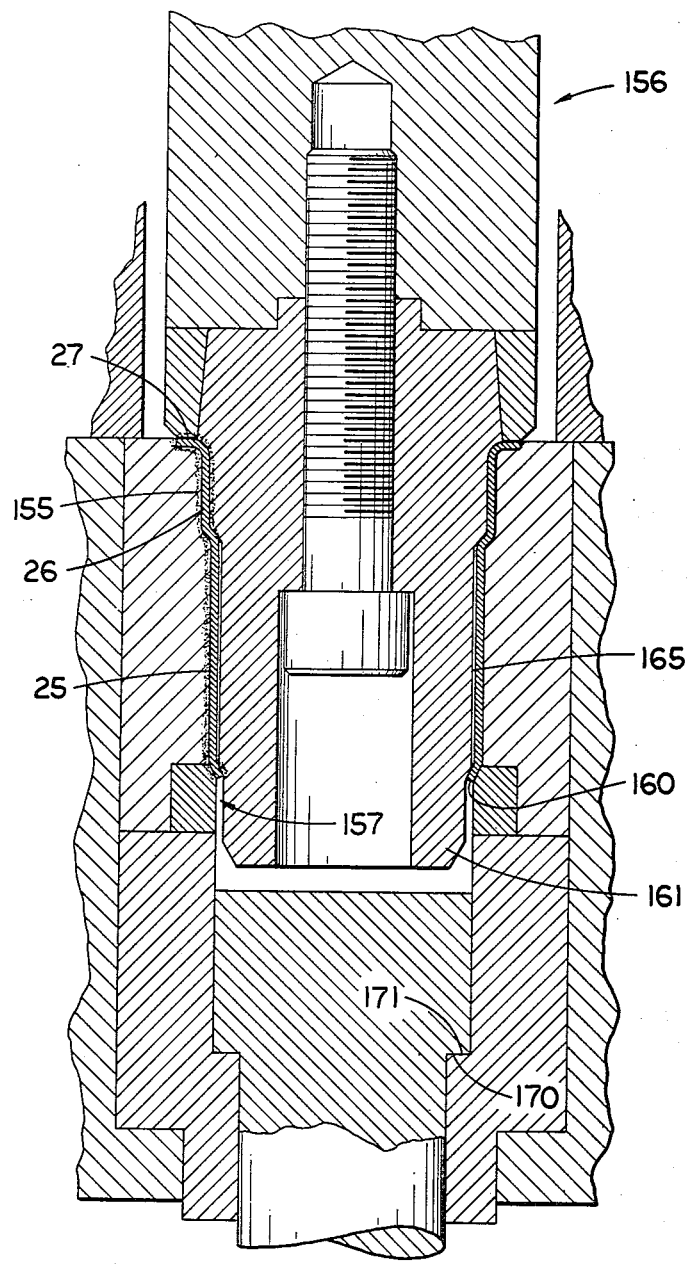
FIGS. 23 and 24 are views similar to FIGS. 19 and 20, respectively, but showing an alternative form of the invention.
Figure 24:
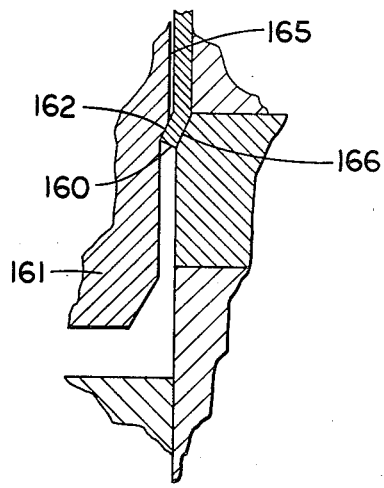

FIGS. 23 and 24 illustrate still further method and apparatus for providing a large chamfer or lead on the chamfered end of the outer or inner metal. The method and apparatus of FIG. 23 does not require forcing the part off of the enlarged head of the ejector punch as in FIGS. 19-22. It should be noted that in the procedure of FIG. 23 (as well as FIG. 19 as well as FIG. 7) the shaded area 155 indicates the contact of the workpiece or blank with the punch 156 and the external die 157. The shaded area extends around the flange 27, the enlarged diameter portion 26 and the outside of and bottom of the reduced diameter portion 25. However, in FIG. 23, unlike FIGS. 7 and 19, the shaded area does not include the lower end 160 of the part. As described above in connection with FIG. 7, the ID of the reduced diameter portion 25 is determined by the deformation of the OD at the reduced diameter portion.

The structure and method of FIG. 23 are identical to FIG. 19 except that the punch is formed to have a pilot portion 161 which projects through the part. The pilot portion 161 prevents the lower end of the part from forming inward in an uncontrolled fashion, and it is final formed by the frustoconical surface 162 immediately above the pilot portion 161. As mentioned, the inside diameter of the part at the reduced portion 25 is slightly greater than the external diameter of the punch at 165 above the frustoconical surface 162.

During operation of the apparatus of FIGS. 23 and 24, the tapered surface 166 of the external die 157 acts to guide the lower end of the part against the pilot portion 161 which acts as a stop while the forming process goes through the various serial steps corresponding to FIGS. 13-16. Final forming of the lower end of the part occurs when the punch 156 reaches the position of FIG. 23 and the surface 162 engages and forms the inside of the lower end of the part. Of course, the surface 162 is stopped in its illustrated position by the meeting of the external die and ejector punch surfaces 170 and 171.

Figure 25:
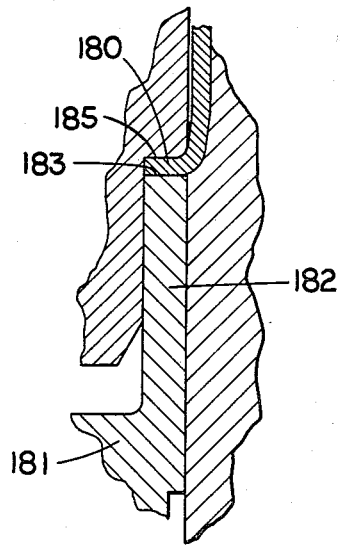
FIG. 25 is a view similar to FIG. 24 but showing still another alternative form of the invention.

It can be seen that the apparatus of FIGS. 23 and 24 permits removal of the part from the dies without stretching of the chamfered end as required in the apparatus of FIG. 19–22. FIG. 25 shows another embodiment of the method and apparatus of this invention which permits even more extensive inward forming of the lower end of the part to the extent of permitting an inwardly directed flange 180 to be formed. The method and apparatus of FIG. 25 are identical to that of FIGS. 23 and 24 with the exception that the ejector punch 181 has an annular projection 182 thereon which has an upper forming surface 183. Also the tapered surface 162 of punch 156 is replaced by the radially extending surface 185.

Figure 25A:
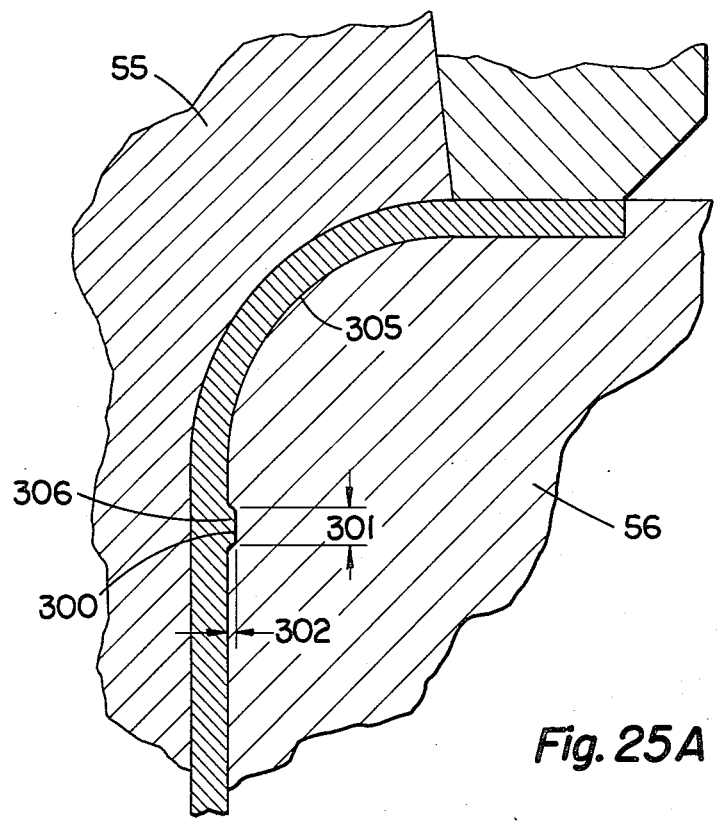
FIG. 25A is a fragmentary axial sectional view similar to FIG. 23 but only showing a portion of the structure illustrated in FIG. 23 and showing an alternative form of the invention.

Referring now to FIG. 25A there is illustrated a preferred feature of the invention which has been found to be useful in production. It is desirable that means be provided for preventing the finished part from sticking on the punch when the punch is pulled out of the external die 56. This has been found to occur occasionally when the punch 55 moves from the position of FIG. 17 to the position of FIG. 18 and can interfere with production. An annular recess 300 is provided in the external die. In one embodiment of the invention the recess 300 has a height (dimension 301) of 0.090" and a depth (dimension 302) of 0.003". The recess 300 is shown in somewhat exaggerated form in FIG. 25A so that it will be visible. The recess 300 is located in the vertical portion of the external die below the radiused portion 305 of the die. When the part is formed, the metal of the blank is coined outwardly into the recess 300. Then when the punch 55 moves upwardly out of the external die 56, the part is held in the external die by the portion 306 of the part which projects into the recess 300. When the ejector 70 moves the part to the position of FIG. 18, the projection 306 is at least partially polished off. However, whether or not it remains on the part it projects outwardly a sufficiently insignificant amount so that it does not affect the final required part tolerances.

Figure 25B:
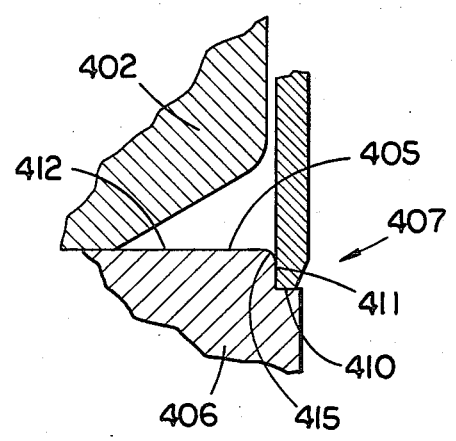
FIG. 25B is a fragmentary axial sectional view similar to FIG. 10 and showing an alternative form of the invention.

Still another preferred form of the invention uses the feature of FIG. 25A and combines the embodiment of FIG. 23 with a modified ejector arrangement as shown in FIG. 25B. In FIG. 23, the ejector 400 has a flat horizontal upper surface 401. In the preferred specific embodiment of FIG. 25B however the punch 402 has an outside diameter which is 0.004" (four thousandths of an inch) less than the outside diameter of a projection 405 on the upper end of the ejector 406. The projection 405 is defined by an annular groove or recess 407 which includes a horizontal surface 410 and a cylindrical vertical surface 411. The vertical surface 411 is connected to the horizontal surface 412 on the top of the projection by a radius 415 which in this particular preferred specific embodiment is 0.030" (thirty thousandths of an inch). The function of the projection 405 is to engage the completed part by an interference fit and to hold it on the ejector until it is knocked off by the rod 416 of FIG. 25C.

The embodiment of FIGS. 23 and 24 has been operated commercially with a blast of air carrying out the function of the mechanical ejector 150 of FIG. 18. In at least one production situation it has been found that such an air blast is not desirable. The production situation involves the use of a flood of lubricant of the part during the forming operation. When an air blast is used on parts having a substantial amount of lubricant thereon, the lubricant is caused to be sprayed in all directions filling the air and soiling the surrounding area. The mechanical ejector 150 of FIG. 18 solves this problem; however, it may cause another problem. It may become detached from the means which moves it or said means can malfunction causing the ejector to be positioned in the path of the punch. When this occurs substantial damage can result to the punch and dies producing substantial down time and repair expense. The ejector of FIG. 25C avoids this latter problem by replacing the massive ejector 150 with the rod 416 which functions somewhat similarly to a pool cue stick to knock the part 417 off of the ejector 406 and away from the forming apparatus through the passageway 420.

Figure 25C:
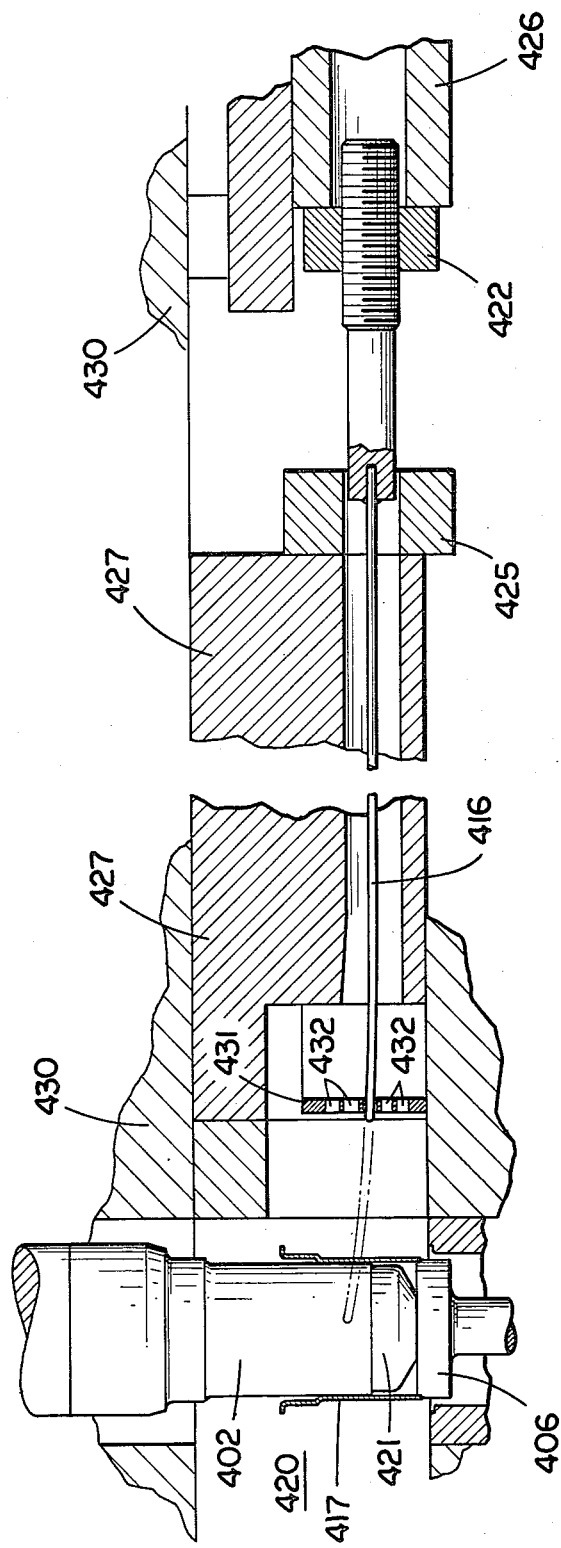
FIG. 25C is a fragmentary axial section of the embodiment of FIG. 23 showing the structure of the ejector apparatus in more detail.

FIG. 25C shows the punch 402 and the ejector 406 in combined positions that do not occur in the normal sequence of operation of this preferred embodiment. When the ejector is in the illustrated position, the punch 402 will be in a position raised above the illustrated position and out of engagement with part 417.

The rod 416 is formed of simple tool steel approximately 3/16" diameter in the illustrated preferred specific embodiment of the invention. It moves through a stroke of 2⅜" which is defined by the block 422 and its engagement with the limit members 425 and 426. Suitable pneumatic means (not shown) is provided to effect this movement. The members 425 and 426 are fixed as are the members 427 and 430. Guide member 431 is also fixed in position and has a plurality of bores 432 therein through one of which the rod 416 projects. The particular bore 432 selected is chosen to aim the rod 416 at the center (both vertically and horizontally) of the part 417. It should be appreciated that the rod 416 can be pushed out of the way by the punch 402 which has a circular cross section. If the ejector malfunctions so that the rod 416 remains to the left as viewed in FIG. 25C when the punch moves downwardly toward the external die, the punch will bend the rod and push it out of the path of the punch so that the punch and external die are not damaged.

The structure and method of operation of the embodiment of FIGS. 25A, 25B and 25C is identical to that of FIG. 23 with the following exceptions. The feature of FIG. 25A insures that the part 417 remains in the external die when the punch 402 is withdrawn upwardly. Further, the feature of FIG. 25A holds the part 417 in position as the ejector 406 moves upwardly into the part 417. When the projection 405 is fully seated in the lower end of the part 417, the horizontal surface 410 engages the bottom of the part and pushes it upwardly out of the external die to the position of FIG. 25C. As suggested above the punch 402 will already be raised out of the part and above the position it is shown in FIG. 25C when the ejector 406 is in the position of FIG. 25C. The projection 405 and the surface 410 firmly hold the part 417 as it is moved from the external die to the position of FIG. 25C. The engagement of the projection and the part 417 is an interference fit produced by the 0.004" difference in I.D. of the part and O.D. of the projection 405. Of course the part 417 has the same I.D. as the O.D. of the lower portion 421 of the punch 402.

Figure 26:
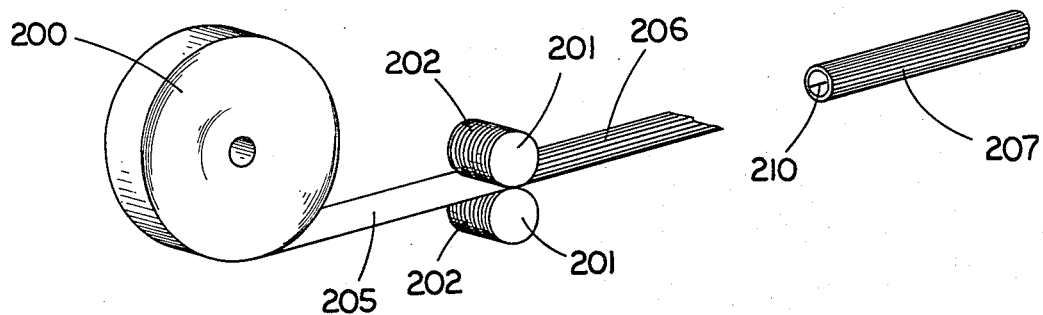
FIG. 26 is a schematic perspective view of the surface preparation procedure of the present invention.
Figure 27:
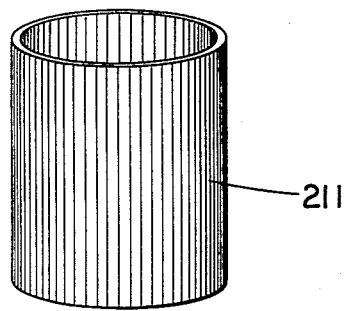
FIGS. 27 and 28 are perspective views of annular members incorporating the surface treatment of the present invention.
Figure 28:
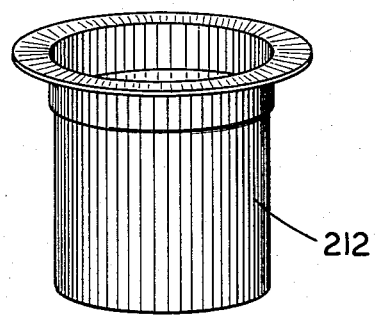

Referring to FIG. 26, there is illustrated a coil 200 of sheet metal which is drawn through rollers 201 by suitable drive means (not shown). The rollers 201 and the drive means may be a part of a conventional reduction mill, the usual function of which is to reduce the thickness of sheet material down to a precise thickness. The rollers 201 may be a part of a tube mill which forms sheet into tube. The rollers 201 have longitudinal grooves 202 and projections 203 in the external surface thereof which are forced into the sheet metal 205 as the rollers rotate and the sheet metal moves through the rollers producing longitudinal grooves 206 and projections 208 in the sheet metal 205. These longitudinal grooves remain in the sheet metal as it is formed and welded into the tubular configuration 207 by a butted joint 210 and is then formed into the annular members 211 and 212 by the identical procedures described above with respect to annular members 20 and 22. Prior to curling the flat sheet 205 into the tubular configuration 207, it may be necessary to trim the edges of the sheet metal so that the tube has the proper diameter. On the other hand, even in a reduction mill the reduction in thickness of the sheet metal normally results in a lengthening rather than a widening thereof.

The rollers 201 in one specific embodiment of the invention are designed as an attachment or addition to operate on the sheet metal before it moves into an existing tube mill. In designing new tube mills or reduction mills, the rollers 201 can be incorporated into the design of the mill so that the rollers have a double function of reduction to a precise thickness as well as surface texturing.

Figure 31:
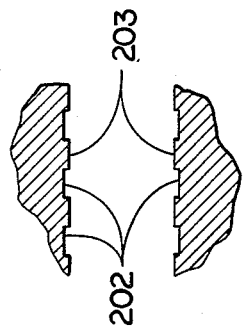
FIG. 31 is an enlarged fragmentary cross section of the rollers 201 showing the surface configuration thereof.
Figure 30:
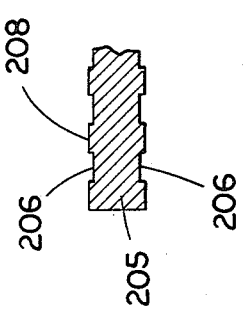
FIG. 30 is an enlarged fragmentary cross section of the sheet metal 205 after it has passed through the rollers 201.

FIG. 30 shows the cross sectional configuration of the sheet metal after it has passed between the rollers 201. The depth, width and configuration of the grooves may vary to provide the result desired; however, in one specific embodiment the grooves 206 are 0.060 inches in width and between 0.002 and 0.995 inches in depth and the projections are of the same width. FIG. 31 shows in cross section the die configuration used to produce the sheet metal surface configuration. This die configuration is constant in cross section. It should be understood that the rolls 201 are fixed in a spaced relationship which is the thickness desired for the sheet metal 205. Because the sheet metal from the coil 200 is thicker than the spacing, a substantial force must be exerted on the sheet metal by the rolls 201 which might be, for example, in the order of 50 Tons and can be calculated given the various parameters of the metal. Thus the structure which holds the rolls in a spaced relationship should be capable of resisting this force.

Figure 29:
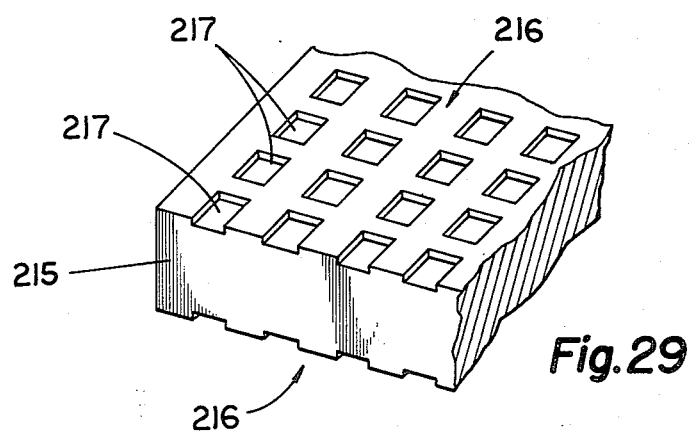
FIG. 29 is a fragmentary perspective view of an annular member having an embossed grid configuration on its surface.

In some applications it is desirable or necessary that the resistance to slippage between the metal sleeves and elastomeric insert be in both the rotary and axial directions in which case the surface configuration of FIG. 29 is desirable. The sheet metal 215 has a pair of grids 216, one on each side, including a series of square recesses 217 which are produced by rollers identical to 201 except that their external configuration is not constant in cross section but instead includes a series of projections of mating configuration to the surface of the sheet metal 215. Thus FIG. 31 is also an appropriate cross sectional representation for the rollers which produce the configuration of FIG. 29.

Figure 32:
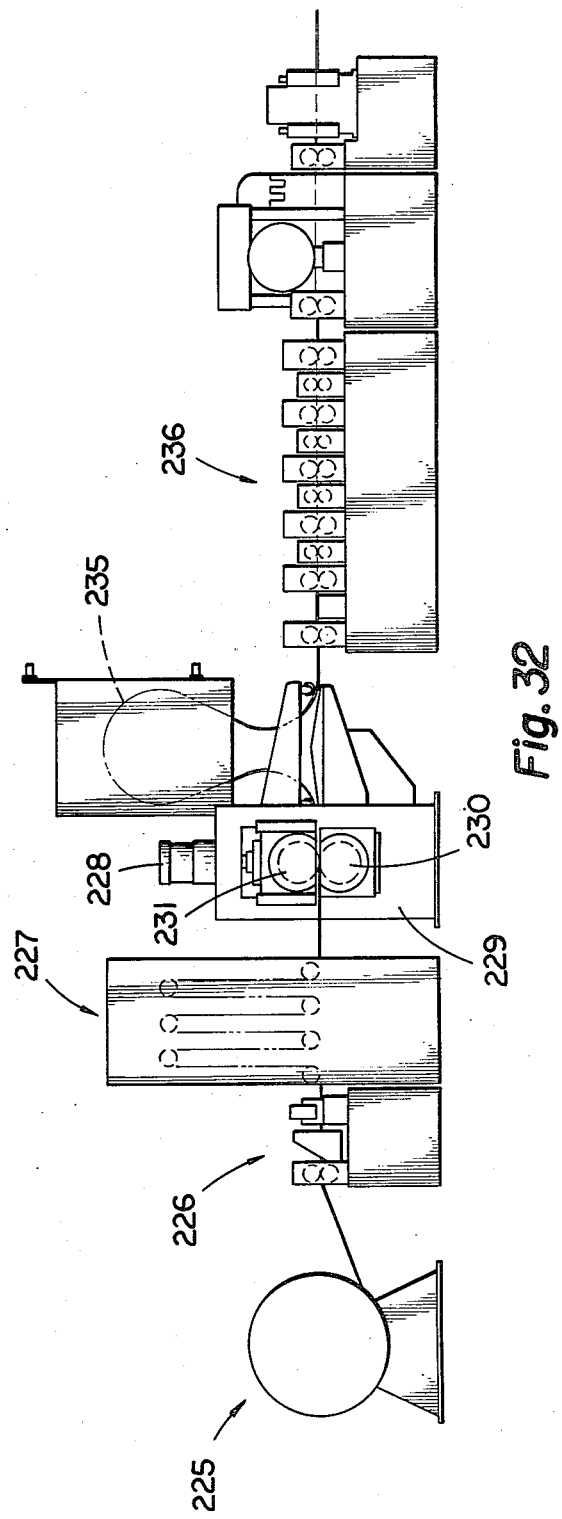
FIG. 32 is a schematic side elevation of a tube mill having the surface texturing device of the present invention combined therewith.

FIG. 32 shows in more detail a tube mill having the present invention incorporated therein. A standard uncoiler 225, which might be, for example, a Single Coil Cradle manufactured by McKay Division of Wean Industries of Youngstown, Ohio, uncoils the sheet metal and feeds it into a standard strip splicer 226 and collector unit which might be, for example, an MPM strip joining shear welder made by the same company and including an accumulator 227. The rollers 201 are represented in FIG. 32 by rollers 230 and 231. The roller 230 is driven and rotatable, and its axis is fixed. The roller 231 is vertically adjustable by the hydraulic motor 228, but its axis can be fixed in a desired spaced relationship to the roller 230 by the frame 229. The surfaces of the rollers 230 and 231 have the appropriate configuration to produce the texturing desired 206 or 216 or any other desired texturing such as, for example, annular lines, diagonal cross hatch or diamond design patterns, longitudinal parallel waved lines, and/or simulated phosphated surface. The structure 228–231 will not be described in greater detail because it is a standard cold reduction mill except for the particular surface of the rollers 230 and 231. An example of such a cold reduction mill is a Fenn Rolling Mill manufactured and sold by Fenn Manufacturing Company of Newington, Conn.

The large loop 235 of sheet metal is used to control the relative speed of the driven roll 230 and the tube mill 236. Two electric eyes, not shown, are located one above and one below the loop 235 and function to slow down or speed up the roll 230. The tube mill 236 is, for example, a 400 series McKay Tube Mill with cut off also manufactured by McKay Division of Wean Industries. The function of the tube mill and welder is to gradually coiled the sheet metal until the opposite edges thereof meet whereupon they are welded together.

It will be evident from the above description that the present invention provides an improved method and apparatus for making metal annular members of precise tolerances and desired surface finish. While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A process for making a metal annular member of precise tolerances which comprises placing an annular sheet metal blank between a punch and an external die, forcing the annular blank into the external die by means of the punch so that the external die reduces the outside diameter of the blank, maintaining said external die in continuous contact with the portion of said blank that is reduced in diameter, causing at least a portion of the inside diameter of the blank to contract as dictated by said reduction of the outside diameter and without interference with the punch, seating one end of the blank against a ridge surrounding the inside of the external die, and driving the punch axially inside the annular blank and the external die until the punch seats against the other end of the blank thereby forming the blank into the desired annular member configuration as determined by the configuration of the punch and the external die and the ridge thereon.

2. The process of claim 1 wherein the annular blank is forced into the external die until the one end of the blank engages a pilot on the punch, said one end being finally formed by said punch when the punch is driven into the annular blank.

3. A process for making a metal annular member of precise tolerances which comprises placing an annular sheet metal blank between a first punch and an external die, locating an ejector punch inside of the external die, forcing the annular blank into the external die by means of the first punch so that the external die reduces the outside diameter of the blank, maintaining said external die in continuous contact with the portion of said blank that is reduced in diameter, causing at least a portion of the inside diameter of the blank to contract as dictated by said reduction of the outside diameter and without interference with the punch seating one end of the blank against the ejector punch and against a ridge surrounding the inside of the external die, driving the first punch axially inside the annular blank and the external die until the first punch seats against the other end of the blank thereby forming the blank into the desired annular member configuration as determined by the configuration of the punches and the external die and the ridge thereon, and ejecting the thus formed annular member from the external die by moving the ejector punch through the external die.

4. A process for making a metal annular member of precise tolerances which comprises placing an annular sheet metal blank between a first punch and an external die, locating an ejector punch inside of the external die, forcing the annular blank into the external die by means of the first punch so that the external die reduces the outside diameter of the blank, maintaining said external die in continuous contact with the portion of said blank that is reduced in diameter, causing at least a portion of the inside diameter of the blank to contract as dictated by said reduction of the outside diameter and without interference with the punch, moving one end of the blank against a tapered ridge surrouding the inside of the external die guiding the one end of the blank inwardly into an annular groove in the ejector punch thereby forming a tapered chamfer on the one end of the blank, and driving the first punch axially inside the annular blank and the external die until the first punch seats against the other end of the blank thereby forming the blank into the desired annular member configuration as determined by the configuration of the punches and the external die.

5. The process of claim 1 additionally comprising the steps of:
withdrawing the punch from the external die and returning it to its initial position;
ejecting the thus formed annular member from the external die by moving an ejector punch through the external die toward said first punch, said annular member being firmly mounted on said ejector punch;
and removing said annular member from the ejector punch by moving a further ejector mechanism sidewardly against the annular member pushing it out of the path of said first punch.

6. The process of claim 5 wherein said further ejector mechanism is arranged to move a long slender rod axially against the annular member at the center thereof.

7. The process of claim 1 wherein said annular sheet metal blank is formed by the steps of moving flat sheet metal between two parallel rollers which are maintained in spaced relation to one another and rotate against the sheet metal as it moves therebetween to deform the surface of the sheet metal blank into a desired surface configuration, curling the sheet metal, and connecting opposite edges thereof, to form the annular sheet metal blank.

8. The process of claim 7 wherein said rollers have a constant cross section and are configured to and do produce grooves in said sheet metal.

9. The process of claim 7 wherein said rollers are configured to and do produce a grid in said sheet metal.

10. A process for making metal annular members of precise tolerances which comprises placing an annular sheet metal blank between a first punch and an external die, locating an ejector punch inside of the external die, forcing the annular blank into the external die by means of the first punch so that the external die reduces the outside diameter of the blank, maintaining said external die in continuous contact with the portion of said blank that is reduced in diameter, causing at least a portion of the inside diameter of the blank to contract as dictated by said reduction of the outside diameter and without interference with the punch, seating one end of the blank against the ejector punch and against a ridge surrounding the inside of the external die, driving the first punch axially inside the annular blank and the external die until the first punch seats against the other end of the blank reducing the outside diameter of the blank all along its length and forming the blank into the desired annular member configuration as determined by the configuration of the punches and the external die and the ridge thereon, and ejecting the thus formed annular member from the external die by moving the ejector punch through the external die.

11. A process for making a metal annular member of precise tolerances and including an annular flange extending outwardly from one end thereof, said process comprising placing an annular sheet metal blank between a first punch and an external die, locating an ejector punch inside of the external die, forcing the annular blank into the external die by means of the first punch thereby seating one end of the blank against the ejector punch and against a ridge surrounding the inside of the external die and causing the external die to reduce the outside diameter of the blank, maintaining said external die in continuous contact with the portion of said blank that is reduced in diameter, causing at least a portion of the inside diameter of the blank to contract as dictated by said reduction of the outside diameter and without interference with the punch, driving the first punch axially inside the annular blank and the external die causing the end portion of the blank to curl outwardly, further driving the first punch into the annular blank and the external die until the first punch seats against the other end of the blank and contains said end portion between said first punch and said external die forming an outwardly extending annular flange on said blank, and ejecting the thus formed annular member from the external die by moving the ejector punch through the external die.

12. A process for making a metal annular member of precise tolerances and including a reduced diameter portion, an enlarged diameter portion and an annular flange on said enlarged diameter portion, said process comprising placing an annular sheet metal blank between a first punch and an external die, locating an ejector punch inside of the external die, forcing the annular blank into the external die by means of the first punch thereby seating one end of the blank against the ejector punch and against a ridge surrounding the inside of the external die and causing the external die to reduce the outside diameter of the blank at one area thereof thereby forming the reduced diameter portion, maintaining said external die in continuous contact with the portion of said blank that is reduced in diameter, causing at least a portion of the inside diameter of the blank to contract as dictated by said reduction of the outside diameter and without interference with the punch, driving the first punch axially inside the annular blank and the external die causing an enlarged portion of the punch to expand a further area of the blank against the external die forming the enlarged diameter portion, further driving the first punch into the annular blank and the external die causing the end portion of the enlarged diameter portion to curl outwardly, further driving the first punch into the annular blank and the external die until the first punch seats against the other end of the blank and contains said end portion between said first punch and said external die forming an outwardly extending annular flange on said enlarged diameter portion, and ejecting the thus formed annular member from the external die by moving the ejector punch through the external die.

* * * * *